(12) United States Patent
Okano et al.

(10) Patent No.: US 11,173,901 B2
(45) Date of Patent: Nov. 16, 2021

(54) VEHICLE CONTROL APPARATUS

(71) Applicant: SUBARU CORPORATION, Tokyo (JP)

(72) Inventors: Masashi Okano, Tokyo (JP); Sogo Kanai, Tokyo (JP); Jun Moriwaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 261 days.

(21) Appl. No.: 16/416,784

(22) Filed: May 20, 2019

(65) Prior Publication Data
US 2020/0031344 A1 Jan. 30, 2020

(30) Foreign Application Priority Data
Jul. 26, 2018 (JP) .............................. JP2018-140377

(51) Int. Cl.
 *B60W 30/12* (2020.01)
 *B62D 15/02* (2006.01)
 *B60W 10/20* (2006.01)

(52) U.S. Cl.
 CPC ............ *B60W 30/12* (2013.01); *B60W 10/20* (2013.01); *B62D 15/021* (2013.01); *B62D 15/025* (2013.01); *B60R 2300/30* (2013.01); *B60W 2420/42* (2013.01); *B60W 2540/18* (2013.01); *B60W 2710/202* (2013.01)

(58) Field of Classification Search
 CPC .. B60W 30/12; B60W 10/20; B60W 2540/18; B60W 2420/42; B60W 2710/202; B62D 15/025; B62D 15/021; B62D 1/286; B62D 6/007; B60R 2300/30
 See application file for complete search history.

(56) References Cited

U.S. PATENT DOCUMENTS

| | | | | |
|---|---|---|---|---|
| 10,870,446 | B2* | 12/2020 | Fujii | B62D 15/0255 |
| 10,875,575 | B2* | 12/2020 | Kunihiro | B62D 1/286 |
| 10,909,855 | B2* | 2/2021 | Ide | B62D 15/0255 |
| 2015/0019082 | A1* | 1/2015 | Inoue | B62D 15/025 |
| | | | | 701/41 |
| 2015/0151786 | A1* | 6/2015 | Fujii | B62D 15/025 |
| | | | | 701/42 |

FOREIGN PATENT DOCUMENTS

JP 2010-195088 A 9/2010

* cited by examiner

*Primary Examiner* — Thomas Ingram
(74) *Attorney, Agent, or Firm* — McDermott Will & Emery LLP

(57) ABSTRACT

A vehicle control apparatus includes an automatic steering control device. The automatic steering control device includes an override determiner, a target steering angle setter, and a target torque setter. The target steering angle setter sets a target steering angle in automatic steering control, based on surrounding information and running condition information. The target torque setter sets a target torque for making the vehicle turn so that a steering angle of the vehicle becomes the target steering angle set by the target steering angle setter. If a steering intention has been detected by the override determiner, during the steering intention being detected, the target steering angle setter sets the steering angle a predetermined length of time before, as the target steering angle.

5 Claims, 5 Drawing Sheets

VEHICLE CONTROL APPARATUS

CROSS-REFERENCE TO RELATED APPLICATIONS

The present application claims priority from Japanese Patent Application No. 2018-140377 filed on Jul. 26, 2018, the entire contents of which are hereby incorporated by reference.

BACKGROUND

The technology relates to a vehicle control apparatus including an automatic steering controller that performs automatic steering control for making an own vehicle run along a lane.

In recent years, for vehicles, various drive assist devices using automatic driving techniques have been developed and put in practical use so that drivers can drive more comfortably and safely. As one of the drive assist devices, an automatic steering control device that performs automatic steering control for making an own vehicle run along a lane is known. In the automatic steering control, for example, a path of travel of an own vehicle is estimated based on a result of recognition of a lane by a camera mounted in the vehicle and control for keeping the own vehicle at a center of the path of travel is performed by adding a predetermined steering force to steering or performing automatic steering.

Drive assist devices such as an automatic steering control device have an override function that, if a driver performs a predetermined driving operation (a steering operation, an acceleration pedal operation or a brake pedal operation) during execution of drive assist control, prioritizes an intention of the driver and suppresses the drive assist control to prioritize manual driving by the driver. When the driver operates the steering during execution of automatic steering control, if the automatic steering control is immediately cancelled, such immediate cancellation bothers the driver, and a steering force added to the steering is lost and a steering torque perceived by the driver suddenly decreases, which makes the driver feel odd. Therefore, it is desirable that cancellation of automatic driving control be performed in a stepwise manner and it is also desirable that in cancelling automatic driving control, a sudden steering torque change be suppressed.

Japanese Unexamined Patent Application Publication (JP-A) No. 2010-195088 discloses a lane keeping controller that performs first steering angle control that emphasizes the capability of following a lane and second steering angle control that facilitates reflection of a steering operation by a driver. The lane keeping controller calculates a torque to be applied to a steering system, using a steering angle deviation that is a value of a difference between a target steering angle and a steering angle, and a predetermined calculated gain. In the second steering angle control, the calculated gain is made to be small in comparison with that in the first steering angle control, and a magnitude and an amount of change of the torque are changed according to a magnitude of the steering angle deviation.

SUMMARY

An aspect of the technology provides a vehicle control apparatus including: an automatic steering controller configured to perform automatic steering control for making an own vehicle run along a lane; a steering intention detector configured to, during execution of the automatic steering control, detect whether a steering intention is present, the steering intention being an intention of a driver to steer the own vehicle; a surrounding information acquiring unit configured to acquire surrounding information that is information on a surrounding of the own vehicle; and a running condition detector configured to detect running condition information that is information on a running condition of the own vehicle, the running condition including at least a steering angle, in which the automatic steering controller comprises a target steering angle setter configured to set a target steering angle in the automatic steering control, based on the surrounding information and the running condition information, and a target torque setter configured to set a target torque for making the own vehicle turn so that the steering angle becomes the target steering angle. If the steering intention has not been detected by the steering intention detector during a period of time from a predetermined time point to a time point of detection of whether the steering intention is present, the target steering angle setter sets a control steering angle that is a steering angle for the own vehicle to run at a predetermined position in the lane at the time point of detection of whether the steering intention is present, as the target steering angle. If the steering intention has been detected by the steering intention detector, during the steering intention being detected, the target steering angle setter sets the steering angle a predetermined length of time before, as the target steering angle.

An aspect of the technology provides a vehicle control apparatus including: circuitry configured to perform automatic steering control for making an own vehicle run along a lane, during execution of the automatic steering control, detect whether a steering intention is present, the steering intention being an intention of a driver to steer the own vehicle, and acquire surrounding information that is information on a surrounding of the own vehicle; and a running condition sensor configured to detect running condition information that is information on a running condition of the own vehicle, the running condition including at least a steering angle, in which the circuitry sets a target steering angle in the automatic steering control, based on the surrounding information and the running condition information, and a target torque for making the own vehicle turn so that the steering angle becomes the target steering angle. If the steering intention has not been detected during a period of time from a predetermined time point to a period of time of detection of whether the steering intention is present, the circuitry sets a control steering angle that is a steering angle for the own vehicle to run at a predetermined position in the lane at the time point of detection of whether the steering intention is present, as the target steering angle. If the steering intention has been detected, during the steering intention being detected, the circuitry sets the steering angle a predetermined length of time before, as the target steering angle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A description is given below of some embodiment s of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following embodiment s which are not recited in a most-generic independent claim of the disclosure are optional and may be provided on an as-needed basis. The drawings are schematic and are not intended to be drawn to scale.

In the lane keeping controller disclosed in JP-A No. 2010-195088, as the own vehicle moves farther away from a target path of the lane keeping control as a result of continuation of a state in which the second steering angle control is executed, a steering reaction force the driver receives becomes large. In other words, as the own vehicle moves farther away from a target path of the lane keeping control, the steering wheel fails to move as intended by the driver, which increasingly makes the driver feel odd.

Therefore, it is desirable to provide a vehicle control apparatus that can reduce an odd feeling given to the driver, when a driver intends to steer an own vehicle during execution of automatic steering control.

Figure 1:
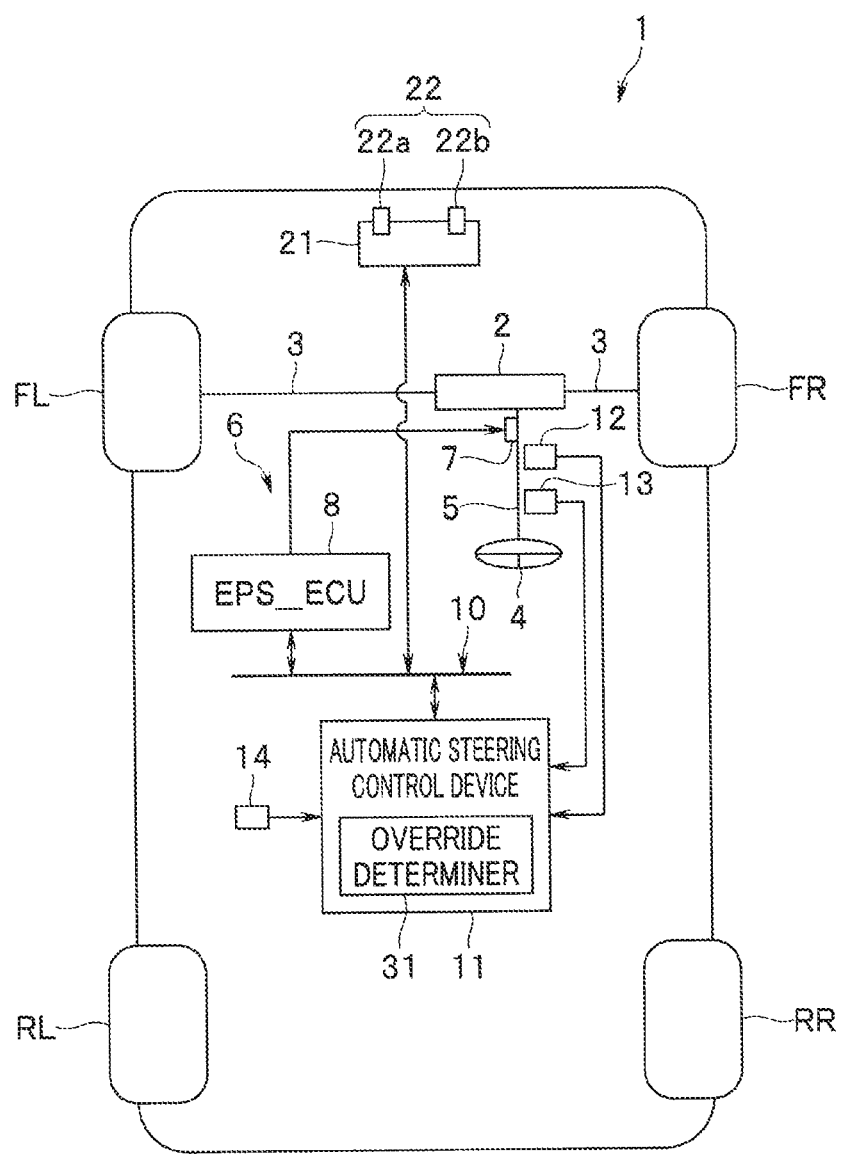
FIG. 1 is a diagram illustrating a schematic configuration of a vehicle in which a vehicle control apparatus according to an embodiment of the technology is mounted.

An embodiment of the technology will be described below with reference to the drawings. First, a schematic configuration of a vehicle in which a vehicle control apparatus according to the embodiment of the technology is mounted will be described with reference to FIG. 1. As illustrated in FIG. 1, a vehicle 1 includes a front left wheel FL, a front right wheel FR, a rear left wheel RL, and a rear right wheel RR. The below description will be provided taking a case where the front left and right wheels FL, FR are driving wheels and steered wheels as an example.

The vehicle 1 further includes a steering mechanism 2, for example, a rack-and-pinion mechanism. The front left and right wheels FL, FR are coupled to the steering mechanism 2 via a tie rod 3 and a steering shaft 5 with a steering wheel 4 fixed at a distal end thereof is coupled to the steering mechanism 2. The front left and right wheels FL, FR are turned to the left/right via the steering mechanism 2 by operation of the steering wheel 4 by a driver.

The vehicle 1 further includes an electric power steering device (hereinafter referred to as "EPS device") 6. The EPS device 6 includes an electric power steering motor (hereinafter referred to as "EPS motor") 7 and an electric power steering control unit (hereinafter referred to as "EPS control unit") 8. Note that in FIG. 1, the EPS control unit is indicated as "EPS_ECU". The EPS motor 7 is joined to the steering shaft 5 via a non-illustrated transmission mechanism.

The EPS control unit 8 sets an assistance torque that assists a steering torque of steering by the driver, based on, e.g., results of detection by a vehicle condition acquiring unit and a lane recognizer, which will be described later. Also, the EPS control unit 8 controls the EPS motor 7 so that the set assistance torque is applied to the steering shaft 5.

The vehicle 1 further includes an automatic steering control device 11. The EPS control unit 8 and the automatic steering control device 11 are connected with an in-vehicle network 10 such as a controller area network (CAN). Although not illustrated, a plurality of units that control running conditions of the vehicle 1, such as an engine control unit, a transmission control unit, and a brake control unit, are further connected with the in-vehicle network 10.

The automatic steering control device 11 is a device that executes automatic steering control for making the vehicle 1 run along a lane. At the time of execution of the automatic steering control, the automatic steering control device 11 sets a target torque that is an assistance torque and transmits an instruction signal corresponding to the set target torque to the EPS control unit 8. The EPS control unit 8 controls the EPS motor 7 based on the received instruction signal so that the set target torque is applied to the steering shaft 5.

A steering torque sensor 12 is coupled to the automatic steering control device 11. The steering torque sensor 12 detects a steering torque input to the steering wheel 4 by the driver. Note that whether the steering torque is positive or negative is defined by whether a direction of operation of the steering wheel 4 is a left-turning direction or a right-turning direction.

When the automatic steering control device 11 detects a predetermined driving operation performed by the driver, the automatic steering control device 11 cancels the automatic steering control. In the embodiment, the automatic steering control device 11 includes an override determiner 31. In the embodiment, determination of whether to cancel the automatic steering control is referred to as an "override determination", and a period from the detection of the driving operation to the actual cancellation of the automatic steering control is referred to as an "override mode period". In the embodiment, the override determiner 31 acquires information on the steering torque detected by the steering torque sensor 12 and makes an override determination based on the acquired steering torque. During a period of execution of the automatic steering control, the period including the override mode period, the override determination is repeatedly performed. Also, as described later, the override determination is made by comparison between the steering torque and a predetermined threshold value. The automatic steering control is cancelled if, for example, during the override mode period, the steering torque becomes no less than a threshold value that is larger than a cancellation threshold value used for the override determination.

The automatic steering control device 11 further includes a steering angle sensor 13 that detects a steering angle of the vehicle 1 and a direction of steering by the driver and a vehicle condition acquiring unit 14 that detects information on running conditions of the vehicle 1 except the steering angle. The vehicle condition acquiring unit 14 is a collective term of sensors that acquire conditions of the vehicle 1. More specifically, for example, the vehicle condition acquiring unit 14 is configured by, e.g., a vehicle speed sensor that detects a vehicle speed of the vehicle 1, a lateral acceleration sensor that detects a lateral acceleration of the vehicle 1 and a yaw rate sensor that detects a yaw rate of the vehicle 1.

Figure 2:
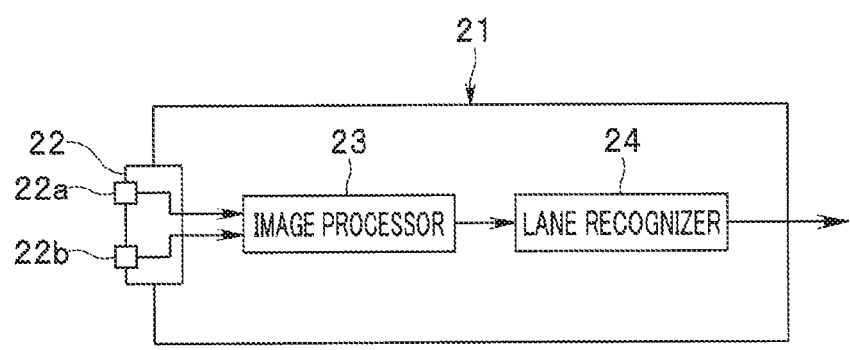
FIG. 2 is a functional block diagram illustrating a configuration of a camera unit in the embodiment of the technology.

The vehicle 1 further includes a camera unit 21. Here, the camera unit 21 will be described in detail with reference to FIGS. 1 and 2. FIG. 2 is a functional block diagram illustrating a configuration of the camera unit 21. The camera unit 21 includes a vehicle-mounted camera 22 configured by a stereo camera including a main camera 22a and a sub camera 22b, an image processor 23, and a lane recognizer 24.

The cameras 22a, 22b are each disposed, for example, in the vicinity of a front windshield in a cabin at a predetermined distance from a center in a vehicle width direction.

The cameras 22a, 22b each include an image pickup device, e.g., CCD or CMOS. The image pickup device picks up an image of a running environment ahead in a direction of travel of the vehicle 1.

The image processor 23 converts a pair of analog images picked up by the cameras 22a, 22b into a digital image of a predetermined luminance gradation. Also, the image processor 23 generates reference image data based on the image picked up by the main camera 22a and generates comparative image data based on the image picked up by the sub camera 22b. Then, the image processor 23 calculates distance data indicating a distance from the vehicle 1 to a target based on a disparity between the reference image data and the comparative image data.

The lane recognizer 24 recognizes lane demarcation lines drawn on opposite, left and right, sides of the lane on which the vehicle 1 runs and based on results of the recognition of the lane demarcation lines, calculates a vehicle lateral position, which is a position in the vehicle width direction of the vehicle 1, a target lateral position, a curvature of the lane on which the vehicle 1 runs (hereinafter referred to as a "lane curvature") and a yaw angle of the vehicle 1 relative to the lane (hereinafter referred to as "yaw angle to lane"). In the embodiment, the target lateral position is a center of the lane, the center being defined from the left and right lane demarcation lines. Note that whether the curvature is positive or negative is defined by whether to turn to the left or to the right.

The lane recognizer 24 calculates the lane curvature, for example, as follows. First, the lane recognizer 24 generates a virtual road plane based on the reference image data and the comparative image data. Next, based on the distance data, the lane recognizer 24 plots inner edges of the left and right lane demarcation lines on the virtual road plane. Next, the lane recognizer 24 calculates curvatures of the left and right inner edges. Next, the lane recognizer 24 calculates the lane curvature based on the curvatures of the left and right inner edges.

Each of the EPS control unit 8, the automatic steering control device 11, and the camera unit 21 is configured mainly by, for example, a microcomputer including, e.g., a CPU, ROM, and RAM. In the ROM, control programs for fulfilling operations set for respective systems are stored.

Figure 3:
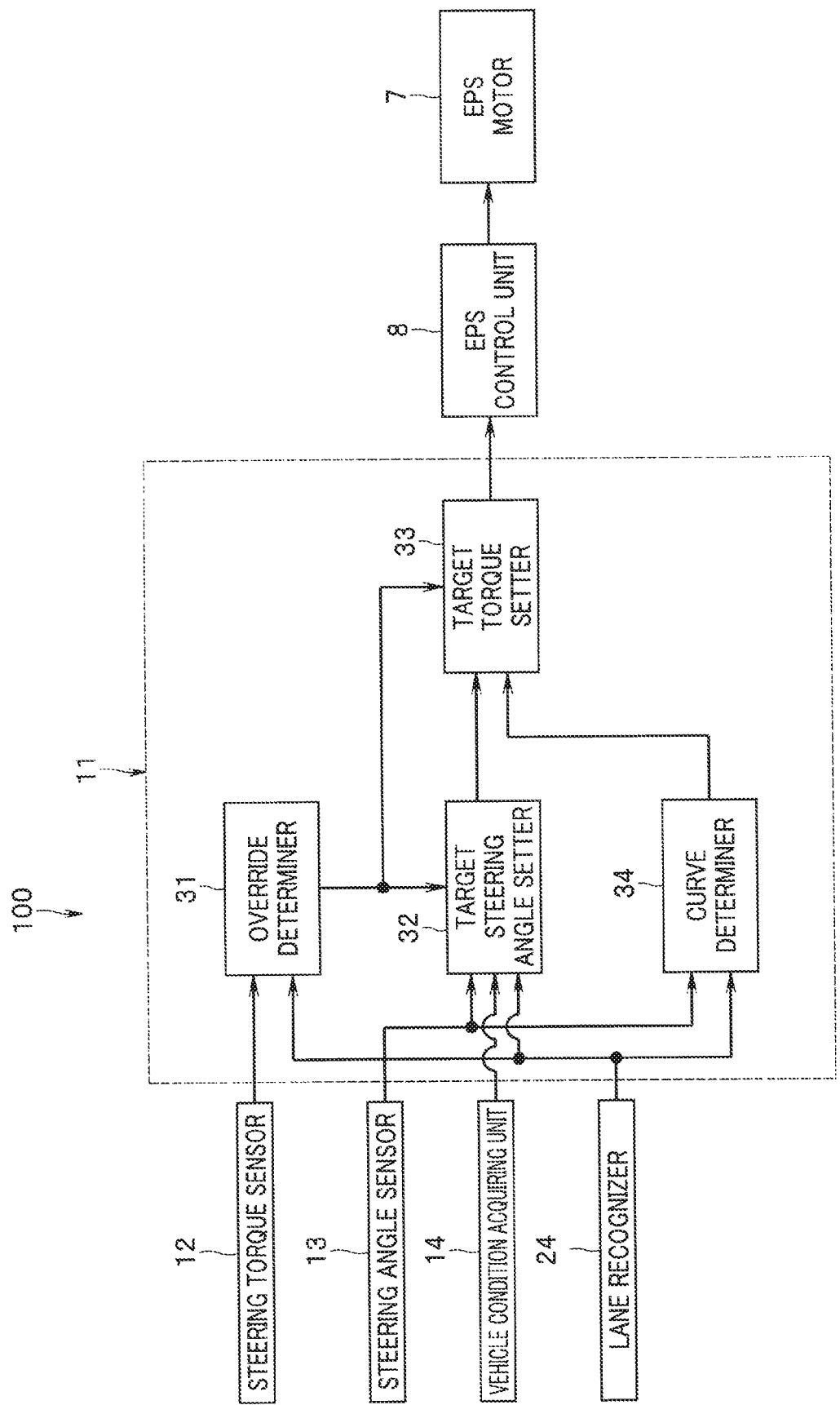
FIG. 3 is a functional block diagram illustrating a configuration of a major part of a vehicle control apparatus according to the embodiment of the technology.

Next, the vehicle control apparatus 100 according to the embodiment will be described with reference to FIG. 3. FIG. 3 is a functional block diagram illustrating a configuration of a major part of the vehicle control apparatus 100. The vehicle control apparatus 100 includes: an automatic steering controller that performs automatic steering control for making the vehicle 1 runs along a lane, a steering intention detector that detects a steering intention that is an intention of the driver to steer the vehicle 1 during execution of the automatic steering control, a surrounding information acquiring unit that acquires surrounding information that is information on a surrounding of the vehicle, and a running condition detector that detects running condition information that is information on a running condition of the vehicle 1, the running condition including at least a steering angle.

The vehicle 1 includes the above-described respective components of the vehicle control apparatus 100. In other words, the vehicle 1 includes the automatic steering control device 11 as the vehicle automatic steering controller, the lane recognizer 24 as the surrounding information acquiring unit, and the steering angle sensor 13 and the vehicle condition acquiring unit 14 as the running condition detector. Also, the vehicle 1 includes the override determiner 31 and the steering torque sensor 12 as the steering intention detector.

As illustrated in FIG. 3, the automatic steering control device 11 includes a target steering angle setter 32, a target torque setter 33, and a curve determiner 34 in addition to the override determiner 31. The target steering angle setter 32 sets a target steering angle in the automatic steering control, based on the surrounding information acquired by the lane recognizer 24 and the running condition information acquired by the steering angle sensor 13 and the vehicle condition acquiring unit 14 and outputs the set target steering angle to the target torque setter 33. Also, in the embodiment, the target steering angle setter 32 sets a target steering angle based on a result of an override determination by the override determiner 31 as well as the surrounding information and the running condition information.

Here, an example of a normal target steering angle setting method will be described. First, the target steering angle setter 32 acquires information on a lane curvature from the lane recognizer 24 and calculates a target steering angle for making the vehicle 1 run along the lane curvature (hereinafter referred to as a "first initial target steering angle"). Next, the target steering angle setter 32 acquires information on a yaw angle to lane from the lane recognizer 24 and calculates a target steering angle for making the yaw angle to lane agree with a predetermined target yaw angle (hereinafter referred to as a "second initial target steering angle"). Next, the target steering angle setter 32 acquires information on a vehicle lateral position from the lane recognizer 24 and calculates a target steering angle for making the vehicle lateral position agree with a predetermined target lateral position in the lane (hereinafter referred to as a "third initial target steering angle"). Next, the target steering angle setter 32 sets a sum of the first to third initial target steering angles as a target steering angle.

The normal target steering angle setting method is a target steering angle setting method in a case where the steering intention has not been detected by the override determiner 31 during a period of time from a predetermined time point to a time point of detection of whether a steering intention is present. The predetermined time point is, for example, a time point a certain period of time before the time point of detection of whether the steering intention is present. A target steering angle setting method in a case where a steering intention has been detected by the override determiner 31 will be described later.

The curve determiner 34 determines whether the lane curves, based on the surrounding information acquired by the lane recognizer 24, for example, the lane curvature. Also, if the lane curves, the curve determiner 34 determines a direction in which the lane curves. Also, the curve determiner 34 determines whether the direction of steering by the driver, which is acquired by the steering angle sensor 13, is a direction toward the outside of the curve of the lane, based on the direction in which the lane curves and the direction of steering. A result of the determination by the curve determiner 34 is output to the target torque setter 33.

The target torque setter 33 sets a target torque for turning the vehicle 1 so that the steering angle of the vehicle 1 becomes the target steering angle set by the target steering angle setter 32 and transmits an instruction signal corresponding to the set target torque to the EPS control unit 8.

Next, execution of the automatic steering control will be described. The automatic steering control is executed by, for example, the driver turning on a switch for the automatic steering control. During execution of the automatic steering control, the target steering angle is set by the target steering angle setter 32 and the target torque is set by the target torque setter 33.

The EPS control unit 8 receives an instruction signal corresponding to the target torque set by the target torque setter 33 and based on the received instruction signal, controls the EPS motor 7 so that the above target torque is applied to the steering shaft 5. The automatic steering control is executed in such a manner as above.

Figure 4:
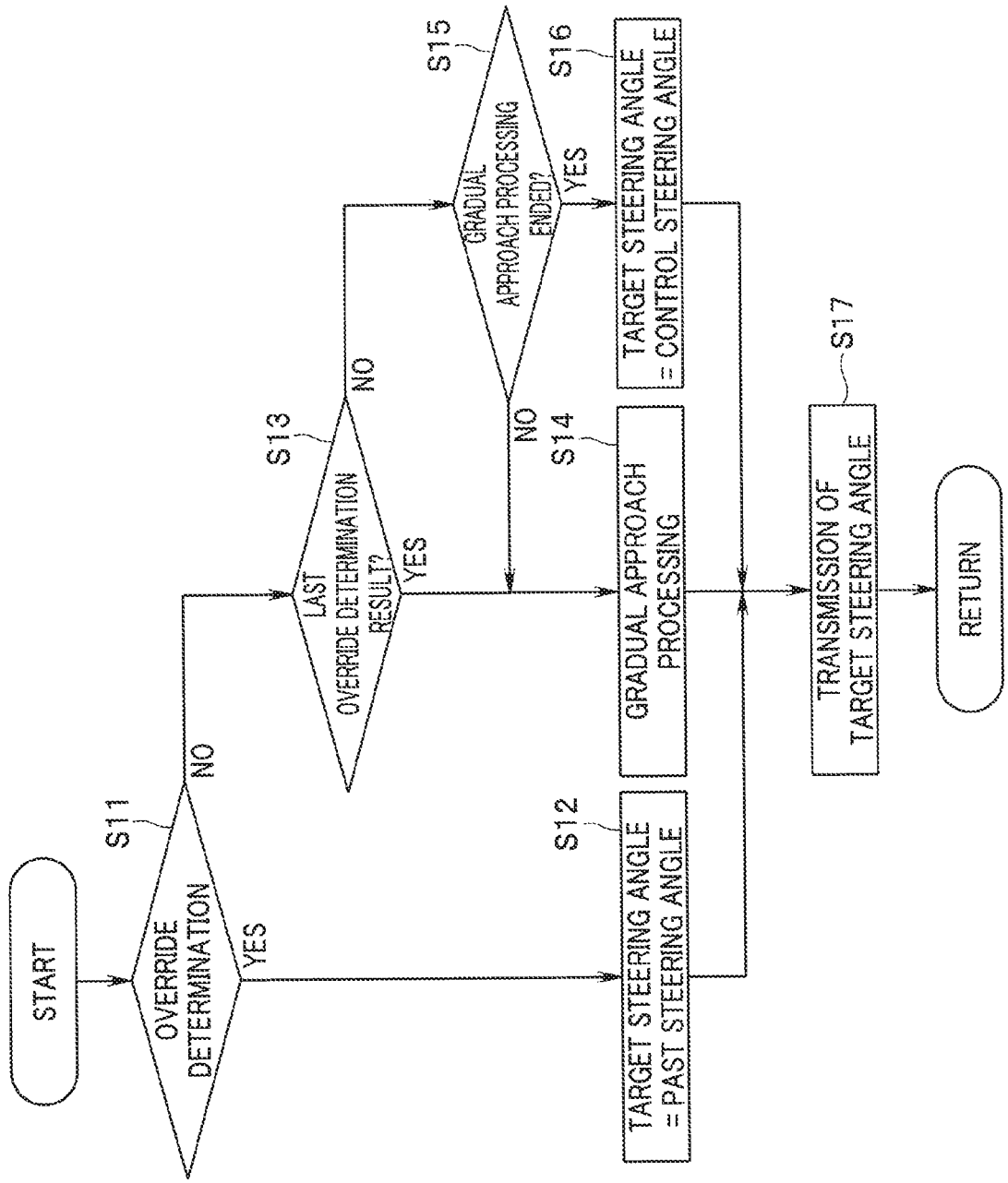
FIG. 4 is a flowchart illustrating target steering angle setting processing in the embodiment of the technology.

Next, target steering angle setting processing for setting a target steering angle will be described with reference to FIGS. 3 and 4. FIG. 4 is a flowchart illustrating the target steering angle setting processing. During a period of execution of the automatic steering control, the period including the override mode period, the target steering angle setting processing illustrated in FIG. 4 is repeatedly performed in a predetermined cycle.

In the target steering angle setting processing, first, the override determiner 31 makes an override determination (step S11). More specifically, for example, the override determiner 31 acquires the information on the vehicle lateral position from the lane recognizer 24 and acquires the information on the steering torque from the steering torque sensor 12. If a direction of the steering torque is a direction away from a predetermined target lateral position in the lane, that is, a center of the lane and a magnitude of the steering torque is larger than a predetermined threshold value, it is presumed that the steering intention of the driver to steer the vehicle 1 is present. In this case, the override determiner 31 makes a determination to cancel the automatic steering control (YES). On the other hand, in a case other than the above case, the override determiner 31 makes a determination not to cancel the automatic steering control (NO).

In the embodiment, as described above, the override determiner 31 detects the steering intention based on at least the steering torque. If the steering intention has been detected, the override determiner 31 makes a determination to cancel the automatic steering control and if no steering intention has been detected, the override determiner 31 makes a determination not to cancel the automatic steering control.

If the determination to cancel the automatic steering control has been made in step S11 (YES), that is, if the steering intention has been detected by the override determiner 31, next, the target steering angle setter 32 sets a steering angle of the vehicle 1, the steering angle being detected by the steering angle sensor 13 and being a steering angle at a time point a predetermined length of time before the current time point, as a target steering angle (step S12). Hereinafter, the steering angle the predetermined length of time before is referred to as a "past steering angle". The predetermined length of time is, for example, 0.1 seconds. If the time point the predetermined length of time before is within a period during which the automatic steering control is being executed except an override mode period, the past steering angle is a target steering angle set according to the normal target steering angle setting method. If the time point the predetermined length of time before is within an override mode period, the past steering angle is a steering angle according to an operation of the steering wheel 4 by the driver at the time point the predetermined length of time before.

If a target steering angle is set according to the normal target steering angle setting method at a time point of detection of whether a steering intention is present, a steering angle for returning a vehicle lateral position to a target lateral position is set as the target steering angle. Hereinafter, a target steering angle according to the normal target steering angle setting method at a time point of detection of whether a steering intention is present is referred to as a "control steering angle". In step S12, a steering angle that is different from the control steering angle is set as the target steering angle.

If the determination not to cancel the automatic steering control has been made in step S11 (NO), that is, if the steering intention has not been detected by the override determiner 31, next, the target steering angle setter 32 reads the override determination result in the last target steering angle setting processing and confirms whether the last override determination result is a determination result to cancel the automatic steering control (step S13). Note that the last override determination result is stored in, for example, the RAM of the microcomputer included in the automatic steering control device 11 or a non-illustrated storage device.

If it is confirmed in step S13 that the last override determination result is the determination result to cancel the automatic steering control (YES), next, the target steering angle setter 32 performs gradual approach processing for making the target steering angle gradually approach the control steering angle (step S14). In other words, if the last override determination result is the determination result to cancel the automatic steering control, in step S12 in the last target steering angle setting processing, a steering angle that is different from the control steering angle is set as the target steering angle. The gradual approach processing is processing for making the target steering angle that is different from the control steering angle gradually approach the control steering angle. The target steering angle setter 32 may make the target steering angle gradually approach the control steering angle by, for example, gradually increasing or gradually decreasing the target steering angle linearly for a predetermined length of time. If no gradual approach processing is performed at a time point of execution of step S14, the target steering angle setter 32 starts the gradual approach processing. Also, if the gradual approach processing is being executed at the time point of execution of step S14, the target steering angle setter 32 continues the gradual approach processing.

If it is confirmed in step S13 that the last override determination result is not the determination result to cancel the automatic steering control (NO), next, the target steering angle setter 32 confirms whether the gradual approach processing has ended (step S15). If the gradual approach processing has not ended (NO), the target steering angle setter 32 continues the gradual approach processing (step S14). If the gradual approach processing has ended (YES), the target steering angle setter 32 sets the control steering angle as the target steering angle (step S16).

In the target steering angle setting processing, after step S12, step S14, or step S16, the target steering angle setter 32 outputs the set target steering angle to the target torque setter 33 (step S17). After step S17, the processing returns to step S11, and a series of processing in steps S11 to S17 is repeatedly performed until the automatic steering control is canceled.

Figure 5:
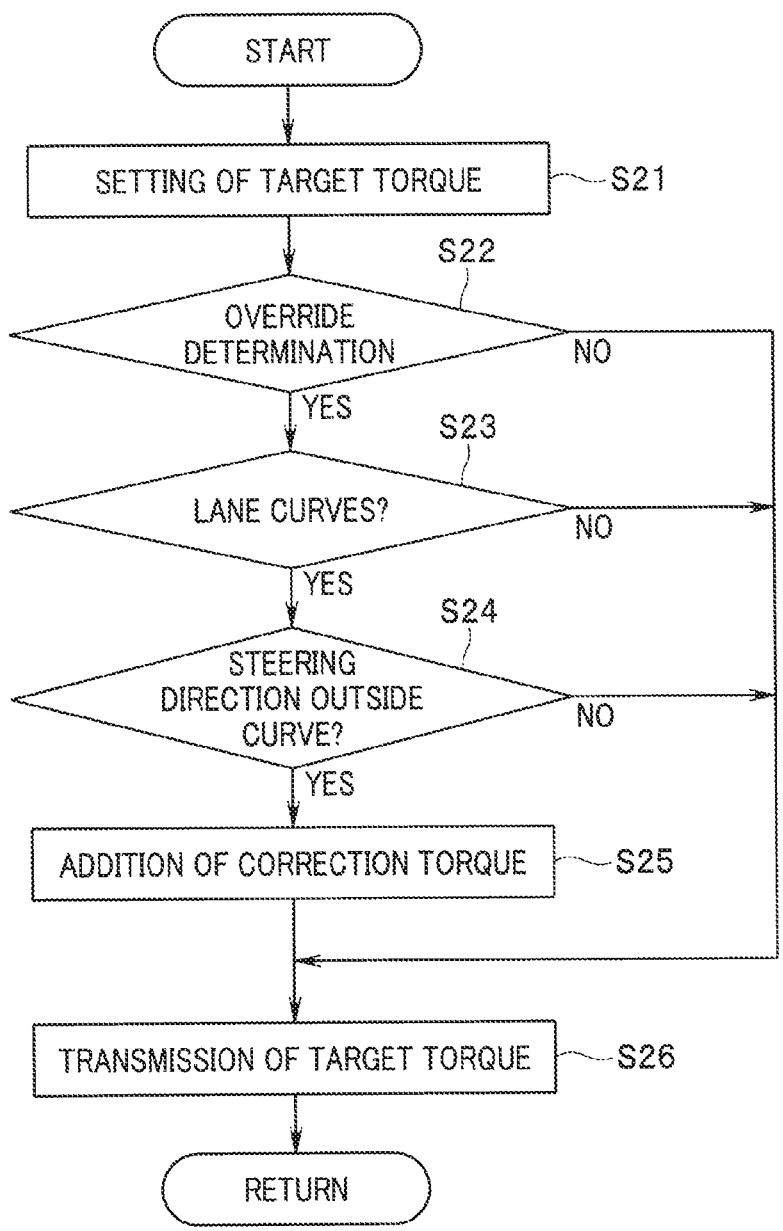
FIG. 5 is a flowchart illustrating target torque setting processing in the embodiment of the technology.

Next, target torque setting processing for setting a target torque will be described with reference to FIGS. 3 and 5. FIG. 5 is a flowchart illustrating the target torque setting processing. During a period of execution of the automatic steering control, the period including an override mode period, the target torque setting processing illustrated in FIG. 5 is repeatedly performed in a predetermined cycle.

In the target torque setting processing, first, an override determination is made by the override determiner 31 (step S21). A specific content of step S21 is the same as the content of step S11 illustrated in FIG. 4. Instead of execution of step S21, processing for reading a latest determination result of an override determination made in the target steering angle setting processing, from the override determiner 31 may be performed.

In the target torque setting processing, next, the target torque setter 33 sets the target torque based on the target steering angle set by the target steering angle setter 32 (step S22). Next, the curve determiner 34 determines whether a running lane curves (step S23).

If it is determined in step S23 that the running lane curves (YES), next, the curve determiner 34 determines whether a steering direction of steering by the driver, the steering direction being acquired by the steering angle sensor 13, is a direction toward the outside of the curve of the lane based on the steering direction and the surrounding information acquired by the lane recognizer 24, more specifically, based on a direction in which the lane curves (step S24).

If it is determined in step S24 that the steering direction is the direction toward the outside of the curve of the lane (YES), next, the target torque setter 33 adds a correction torque to make the vehicle 1 turn in a direction toward the inside of the curve of the lane to the target torque (step S25). Note that a magnitude of the correction torque may be changed according to, for example, a magnitude of a curvature of the curve.

Also, in step S25, the target torque setter 33 may add the correction torque to the target torque while gradually increasing the magnitude of the correction torque linearly for a predetermined length of time. Hereinafter, processing for adding the correction torque to the target torque while gradually increasing the magnitude of the correction torque linearly is referred to as "gradual increase processing". If no gradual increase processing is performed at the time point of execution of step S25, the target torque setter 33 starts the gradual increase processing. Also, if the gradual increase processing is being executed at the time point of execution of step S24, the target torque setter 33 continues the gradual increase processing.

If the determination not to cancel the automatic steering control is made in step S22 (NO), if it is not determined in step S23 that the running lane curves (NO), if it is not determined in step S24 that the steering direction is the direction toward the outside of the curve of the lane (NO), or after step S25, the target torque setter 33 outputs the set target torque to the EPS control unit 8 (step S26). After step S26, the processing returns to step S21, and the series of processing in steps S21 to S26 is repeatedly performed until the automatic steering control is cancelled.

In a case where a correction torque was added in the last target torque setting processing but no correction torque is added in the current target torque setting processing, such as a case where the lane is straight following the curve, the target torque setter 33 may add the correction torque to the target torque while gradually decreasing the correction torque added to the last target torque so that the last target torque gradually approaches the current target torque.

Next, operation and effects of the vehicle control apparatus 100 according to the embodiment will be described. In the embodiment, if the determination to cancel the automatic steering control has been made, that is, during a period of time during which the steering intention is being detected in the case where the steering intention is detected by the override determiner 31, the target steering angle setter 32 sets the steering angle the predetermined length of time before as the target steering angle. Here, the "period of time during which the steering intention is being detected" can be regarded as a period of time from the time point of detection of the steering intention until the steering intention is not detected. As described above, if the time point the predetermined length of time before is within the period of time during which the automatic steering control is being executed, the period excluding the override mode period, the steering angle the predetermined length of time before is the control steering angle. If the time point the predetermined length of time before is within the override mode period, a steering angle the predetermined length of time before is the steering angle according to the operation of the steering wheel 4 by the driver the predetermined length of time before. In either case, the steering angle according to the operation of the steering wheel 4 by the driver at the time point of detection of whether a steering intention is present is a steering angle that is different from the target steering angle. A difference in the steering angle acts on the steering wheel 4 as a pseudo-friction force. Consequently, the embodiment enables the driver to recognize that the automatic steering control is being executed.

Also, in the case where the steering intention has been detected, if the target torque is suddenly decreased or is lost, the driver has a feeling that the steering wheel 4 suddenly becomes light, what is called a "feeling of loss". On the other hand, according to the embodiment, the pseudo-friction force is generated based on the steering angle the predetermined length of time before to make the target torque change small, enabling prevention of giving the feeling of loss to the driver.

If the state in which the steering intention is detected without the automatic steering control being cancelled, that is, the state in which the driver operates the steering wheel 4 continues during the override mode period, a deviation amount of the lateral position of the vehicle 1 from the target lateral position (the center of the lane) increases. If, during the override mode period, the target steering angle is set based on the vehicle lateral position and the target torque is set based on the target steering angle, a steering reaction force the driver receives becomes larger as the deviation amount becomes larger. In other words, as the deviation amount becomes larger, during the override mode period, the steering wheel 4 becomes unable to be moved as intended by the driver and the vehicle 1 becomes unable to be steered as intended by the driver.

On the other hand, in the embodiment, if the state in which the driver operates the steering wheel 4 continues during the override mode period, the steering angle according to the operation of the steering wheel 4 by the driver the predetermined length of time before is set as the target steering angle. In other words, in the embodiment, depending on the deviation amount of the lateral position of the vehicle 1 from the target lateral position, neither the target steering angle nor the steering reaction force changes. Consequently, according to the embodiment, even if the deviation amount becomes large during the override mode period, the steering wheel 4 can be moved as intended by the driver and the vehicle 1 can be steered as intended by the driver.

According to the above, the embodiment enables reducing an odd feeling given to the driver when the driver intends to steer the vehicle 1 during execution of the automatic steering control.

Also, in the embodiment, in the case where the steering intention has not been detected by the override determiner 31 during a period of time from a predetermined time point to the time point of detection of whether a steering intention is present (hereinafter referred to as a "first case"), the target steering angle setter 32 sets the control steering angle at the time point of detection of whether the steering intention is present, as the target steering angle. In the embodiment, a case where the determination not to cancel the automatic steering control is made and no gradual approach processing is performed in the last target steering angle setting processing and the current target steering angle setting processing corresponds to the first case.

Also, in the embodiment, if the steering intention stops being detected within a predetermined period of time after the detection of the steering intention by the override determiner 31 (hereinafter referred to as a "second case"), the target torque setter 33 gradually increases the magnitude of the target torque so that the steering angle gradually approaches the control steering angle. In the embodiment, each of a case where the determination not to cancel the automatic steering control was made in the last target steering angle setting processing and the determination to cancel the automatic steering control has been made in the current target steering angle setting processing and a case where the determination not to cancel the automatic steering control was made in the last target steering angle setting processing and has been made in the current target steering angle setting processing and the gradual approach processing is being performed corresponds to the second case. Also, in the embodiment, the magnitude of the target torque is gradually increased by making the steering angle gradually approach the control steering angle by means of the gradual approach processing. Consequently, the embodiment enables prevention of a sudden target torque increase and thus abrupt steering in the second case.

When the running lane curves, a steering direction may unconsciously be directed toward the outside of the curve of the lane because of, e.g., a decrease in attention of the driver. In this case, although no steering intention is present, the steering intention is detected by the override determiner 31 and as a result, the automatic steering control is cancelled, which may result in deviation of the vehicle 1 from the running lane. On the other hand, in the embodiment, in the case where the steering intention has been detected by the override determiner 31 and it has been detected by the curve determiner 34 that the running lane curves and the steering direction is a direction toward the outside of the curve of the lane (hereinafter referred to as a "third case"), the target torque setter 33 adds the correction torque to make the vehicle 1 turn in a direction toward the inside of the curve of the lane to the target torque. Consequently, the embodiment enables prevention of the automatic steering control being cancelled although no steering intention is present.

Also, in the embodiment, the target torque setter 33 adds the correction torque to the target torque while gradually increasing the magnitude of the correction torque. Consequently, the embodiment enables prevention of a sudden target torque increase and thus abrupt steering.

If the running lane curves and the steering direction is a direction toward the inside of the curve of the lane, it is presumed that the steering intention is present. In this case, the target torque setter 33 adds no correction torque to the target torque.

The technology is not limited to the above-described embodiment and various changes, alterations, and the like are possible without departing from the gist of the technology. For example, in the above-described second case, instead of the target steering angle setter 32 performing the gradual approach processing, the target torque setter 33 may directly gradually increase the magnitude of the target torque.

Also, in the above-described third case, instead of the target torque setter 33 directly adding the correction torque, the target steering angle setter 32 may add a correction steering angle to make the vehicle 1 turn in a direction toward the inside of the curve of the lane, to the target steering angle.

Each of the automatic steering control device 11 and the camera unit 21 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the automatic steering control device 11 including the override determiner 31, the target steering angle setter 32, the target torque setter 33, and the curve determiner 34 (see FIG. 3) and the camera unit 21 including the image processor 23 and the lane recognizer 24 (see FIG. 2). Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the modules shown in FIGS. 1 to 3.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus comprising one or more processors programmed to perform as:
   an automatic steering controller configured to perform automatic steering control for making an own vehicle run along a lane;
   a steering intention detector configured to, during execution of the automatic steering control, detect whether a steering intention is present, the steering intention being an intention of a driver to steer the own vehicle;
   a surrounding information acquiring unit configured to acquire surrounding information that is information on a surrounding of the own vehicle; and
   a running condition detector configured to detect running condition information that is information on a running condition of the own vehicle, the running condition including at least a steering angle, wherein
the automatic steering controller comprises
a target steering angle setter configured to set a target steering angle in the automatic steering control, on a basis of the surrounding information and the running condition information, and
a target torque setter configured to set a target torque for making the own vehicle turn so that the steering angle becomes the target steering angle,
if the steering intention has not been detected by the steering intention detector during a period of time from a predetermined time point to a time point of detection of whether the steering intention is present, the target steering angle setter sets a control steering angle that is a steering angle for the own vehicle to run at a predetermined position in the lane at the time point of detection of whether the steering intention is present, as the target steering angle, and
if the steering intention has been detected by the steering intention detector, during the steering intention being detected, the target steering angle setter sets as the target steering angle, a steering angle that has been set by the target steering angle setter based on the surrounding information and the running condition information before a predetermined length of time.

2. The vehicle control apparatus according to claim 1, wherein if the steering intention is not detected within a predetermined period of time after the detection of the steering intention by the steering intention detector, the target torque setter gradually increases a magnitude of the target torque so that the steering angle gradually approaches the control steering angle.

3. The vehicle control apparatus according to claim 1, further comprising a curve determiner configured to determine whether the lane curves and, if the lane curves, determine a direction in which the lane curves, wherein
the running condition detector further detects a steering direction of steering by the driver, as the running condition information,
the curve determiner further determines whether the steering direction is a direction toward an outside of the curve of the lane, on a basis of the direction in which the lane curves and the steering direction, and
if the steering intention detector detects the steering intention, and the curve determiner detects that the lane on which the vehicle is running curves and the steering direction is a direction toward the outside of the curve of the lane, the target torque setter adds a correction torque in a direction in which the correction torque makes the own vehicle turn in a direction toward an inside of the curve of the lane to the target torque.

4. The vehicle control apparatus according to claim 3, wherein the target torque setter adds the correction torque to the target torque while gradually increasing the magnitude of the correction torque.

5. A vehicle control apparatus comprising:
circuitry configured to perform automatic steering control for making an own vehicle run along a lane, during execution of the automatic steering control, detect whether a steering intention is present, the steering intention being an intention of a driver to steer the own vehicle, and acquire surrounding information that is information on a surrounding of the own vehicle; and
a running condition sensor configured to detect running condition information that is information on a running condition of the own vehicle, the running condition including at least a steering angle, wherein
the circuitry sets a target steering angle in the automatic steering control, on a basis of the surrounding information and the running condition information, and a target torque for making the own vehicle turn so that the steering angle becomes the target steering angle,
if the steering intention has not been detected during a period of time from a predetermined time point to a period of time of detection of whether the steering intention is present, the circuitry sets a control steering angle that is a steering angle for the own vehicle to run at a predetermined position in the lane at the time point of detection of whether the steering intention is present, as the target steering angle, and
if the steering intention has been detected, during the steering intention being detected, the circuitry sets as the target steering angle, a steering angle that has been set by the circuitry based on the surrounding information and the running condition information before a predetermined length of time.

* * * * *